United States Patent

Gardner

[11] 3,914,941
[45] Oct. 28, 1975

[54] METERING VALVE FOR PROPORTIONING AN INPUT FORCE BETWEEN CONCENTRIC PISTONS

[75] Inventor: Delbert J. Gardner, South Bend, Ind.

[73] Assignee: The Bendix Corporation, South Bend, Ind.

[22] Filed: June 20, 1974

[21] Appl. No.: 481,435

[52] U.S. Cl. ................. 60/553; 60/562; 91/434
[51] Int. Cl.² .................................... F15B 7/00
[58] Field of Search ............ 60/553, 554, 556, 565, 60/566, 549, 550, 562; 188/357, 345; 91/434

[56] References Cited
UNITED STATES PATENTS
| | | | |
|---|---|---|---|
| 3,031,850 | 5/1962 | Prather | 60/554 X |
| 3,514,163 | 5/1970 | MacDuff | 60/565 X |

Primary Examiner—Martin P. Schwadron
Assistant Examiner—H. Burks, Sr.
Attorney, Agent, or Firm—Leo H. McCormick, Jr.; William N. Antonis

[57] ABSTRACT

A metering valve apparatus for transferring a servomotor force from a first piston to a second piston in response to an input force to produce an operational braking force. The first and second pistons are initially simultaneously moved by a differential pressure responsive movable wall to pressurize fluid in interconnected first and second chambers in response to the input force. A predetermined input force will independently move the second piston with respect to the first piston to interrupt the communication between the first chamber and the second chamber and allow pressurized fluid to escape into a third chamber. As the pressurized fluid escapes into the third chamber the wall will move to supply the second piston with the servomotor force to further pressurize the fluid in the second chamber.

7 Claims, 3 Drawing Figures

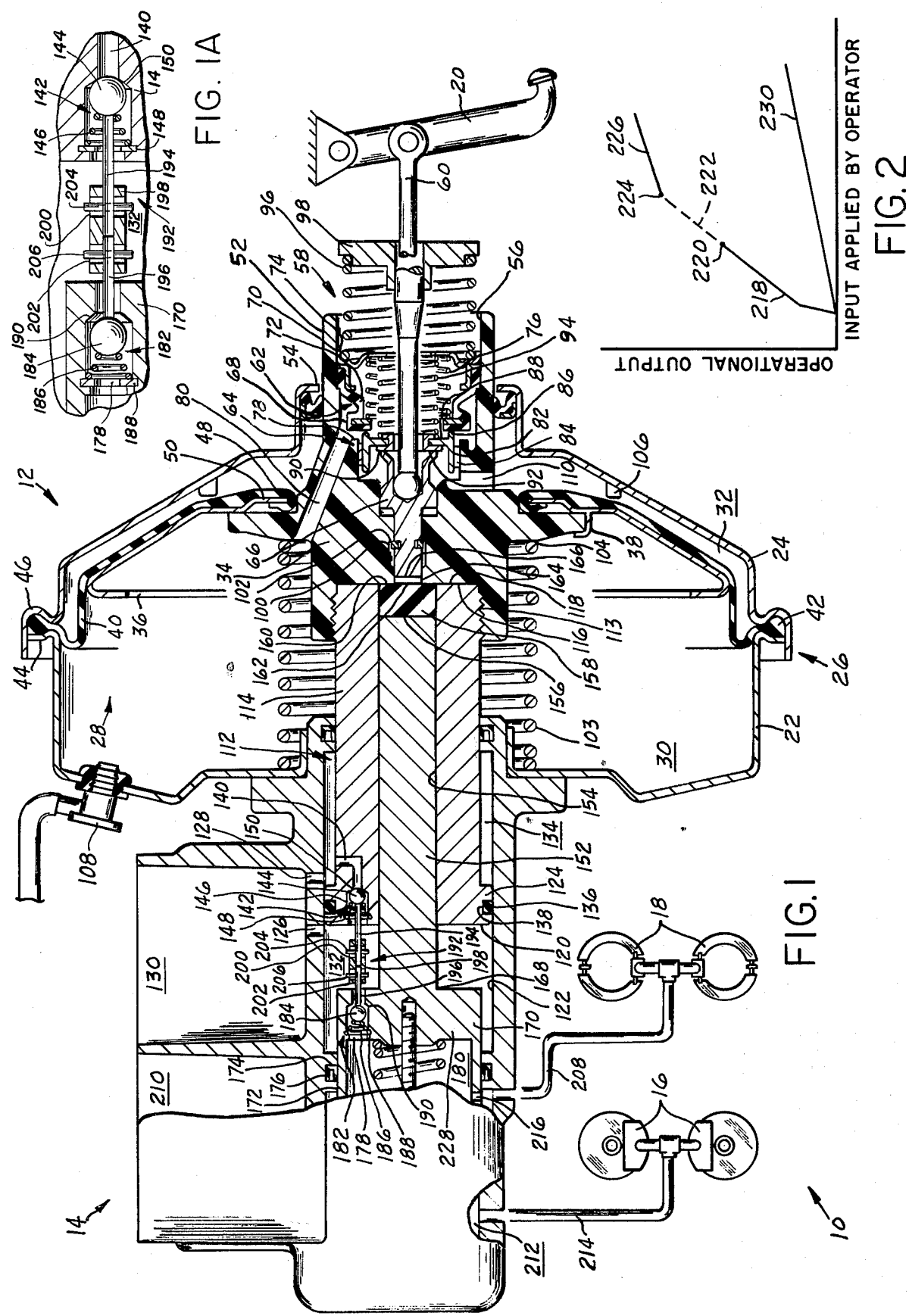

3,914,941

METERING VALVE FOR PROPORTIONING AN INPUT FORCE BETWEEN CONCENTRIC PISTONS

BACKGROUND OF THE INVENTION

In U.S. Pat. No. 3,559,406, incorporated herein by reference, I disclosed how concentric pistons could be utilized within a servomotor to develop an increased output when the desired braking force exceeds that which can be generated by the pressure differential acting across a wall in the servomotor. The concentric pistons are moved simultaneously by the pressure differential created within the servomotor until vacuum runout occurs after which one of the pistons moves independently of the other in response to a manual input to supply the master cylinder with an additional operational force. However, the additional operational force will act on both the first and second concentric pistons to reduce the effect of the manual input by changing the volume of the pressure chamber within the master cylinder.

In copending U.S. application Ser. No. 481,434, filed June 20, 1974, I disclosed how the movement of the second piston could actuate a valve to lock the first piston in a stationary position upon independent movement of the second piston to obtain a maximum direct output force from the input force.

SUMMARY OF THE INVENTION

I have devised a metering means for reducing a first hydraulic fluid pressure in a first chamber as a function of an operational input force to proportionally transfer that portion of an operational pressure differential across a movable wall acting on a first piston to a second piston in a second chamber and produce a second hydraulic fluid pressure.

A first valve associated with the second piston closes communication between the first chamber and the second chamber initially upon independent movement of the second piston. Further independent movement will open communication between the first chamber and a third chamber to proportionally reduce the fluid pressure in the first chamber as a function of the input force individually moving the second piston. As the fluid pressure in the first chamber is reduced, the movable wall will act on the second piston through a reaction means to pressurize the fluid in the second chamber.

It is therefore the object of this invention to provide a servomotor with a hydraulic ratio changer for supplying a fluid pressurizer with an actuation force proportional to an operational input force.

It is another object of this invention to provide a servomotor having a hydraulic ratio changer with metering means for proportionally transferring an output force from a first piston to a second piston to provide a brake actuator with an operational input.

It is a further object of this invention to provide a means to proportionally transfer an output force from a first piston to a concentric second piston upon independent movement of the second piston caused by an input force.

It is still another object of this invention to provide a servomotor, whose output is transmitted through simultaneous movement of concentric pistons to supply a brake with an operational force, with a hydraulic ratio changer for sequentially switching to a single piston in response to an input force independently moving the unitary piston to increase the fluid pressure supplied to the brake actuator.

BRIEF DESCRIPTION OF THE DRAWINGS

FIG. 1 is a sectional view of a power braking system having a servomotor with a hydraulic ratio changer for proportionally transferring an output force from a first piston to a second piston to develop an operational force to operate the wheel brakes.

FIG. 1A is an enlarged sectional view of the linkage means of FIG. 1.

FIG. 2 is a graph showing the relationship between the pedal effort required to operate the servomotor of FIG. 1 and the output force deliverable to operate a master cylinder.

DETAILED DESCRIPTION OF THE PREFERRED EMBODIMENT

The braking system 10, shown in FIG. 1, has a fluid pressure servomotor 12 connected to a master cylinder 14 for supplying the front wheel brakes 16 and the rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the shell 22 and shell 24 to form a first variable volume chamber 30 and a second variable volume chamber 32. The wall means 28 has a central hub 34 to which a backing plate 36 is attached by fingers 38. A diaphragm 40 has a first bead 42 on its periphery which is held between flange 44 and flange 46 on the first shell 22 and the second shell 24, respectively, and a second bead 48 which is snapped onto lip 50 of the backing plate 36.

The hub 34 has a rearwardly extending projection 52 which extends through opening 54 in the second shell 24. The projection 52 has an axial bore 56 into which a control valve means 58 is located for supplying an operational input from the pedal 20 through push rod 60.

The control valve means 58 has a vacuum poppet assembly 62 and an atmospheric poppet assembly 64 which are operated when push rod 60 moves plunger 66.

The vacuum poppet assembly 62 has a face 68 separated from a bead 70 by a flexible section 72. The bead 70 is fixed within bore 56 by a retainer 74 which surrounds the push rod 60. A first spring 76 urges the face 68 toward a vacuum seat 78 adjacent passage 80 connecting the first chamber 30 with the interior 56 of the hub means 34.

The atmospheric poppet 64 has a cylindrical section 82 which is positioned within the bore 56 by a plurality of projections 84 for guiding a first atmospheric seat 86 into contact with face 68. An interior annular projection 88 extends from the cylindrical section 82 toward the push rod 60. One side of the interior annular projection 88 forms a second atmsopheric seat 90 which is urged toward the rearward projection 92 on the plunger 66 by a spring 94 secured to the retainer 74. Another spring 96 has one end located on the retainer 74 and another end retained by plate 98 extending from the push rod 60 to return and hold the keeper ring 100 on plunger 66 against shoulder 102 in the hub 34. A return spring 103 is located between the first shell 22 and the shoulder 104 to hold the hub 34 against bumper 106 against the shell 24. In this position vacuum is communicated from the intake manifold of the vehicle through check valve 108 to the first chamber 30. Air at atmospheric pressure can flow through passage 110 into the bore 56 and out the first passage in response to the vacuum communication to suspend the wall means 28.

A hydraulic ratio changer means 112 has a first piston 114 secured to the hub 34 by threaded connection 113 until a first end 116 abuts shoulder 118. The first piston 114 has a second end 120 which extends into bore 122 of the master cylinder 14. The end 120 has a flange 124 which separates a first compensation port 126 from a second compensation port 128 through which reservoir 130 is communicated to a first pressurizing chamber 132 and a relief chamber 134. A seal 136 is located in a groove 138 in the flange 124 to prevent communication along the bore 122 between the first pressurizing chamber 132 and the relief chamber 134. A first passage 140 in the end 120 permits communication between the first pressurizing chamber 132 and the relief chamber 134. A first valve means 142 located in passage 140 has poppet 144 which is urged against seat 150 by a first spring or resilient means 146. The first resilient means 146 is retained in the passage by a snap ring 148.

The hydraulic ratio changer means 112 has a second piston 152 which is concentrically located within bore 154 of the first piston 114. A first end 156 of the second piston 152 engages a resilient reaction disc 158. The reaction disc 158 has a first area 160 which engages shoulder 118 of the hub while a second area 162 closes section 164 of bore 56. The end 166 of the plunger 66 is adapted to engage the second area 162 to provide the operator with a "feel" representative of the fluid pressure developed in the master cylinder 14. The second piston 152 has a second end 168 with a flange 170 which is carried on guide surface 172. A seal 174 is located in a groove 176 of the guide surface to prevent fluid communication between the first pressurizing chamber 132 and a second pressurizing chamber 180 along the bore 122. A passage 178 is located in the flange 170 to provide communication between the first chamber 132 and a second chamber 180. A valve means 182 located in passage 178 has a poppet 184 which is urged toward a seat 190 by a spring or resilient means 186. The resilient means 186 is retained in the passage 178 by a snap ring 188.

A linkage means 192 as shown in FIG. 1A has a first stem 194, attached to the first poppet 144, and a second stem 196, attached to the second poppet 184, joined together by a sleeve 198. The sleeve 198 has a first slot 200 adjacent one end and a second slot 202 adjacent the other end. A first pin 204 extends through slot 200 and is fixed to the first stem 194. A second pin 206 extends through slot 202 and is fixed to the second stem 196. As shown in FIG. 1, with the servomotor in the rest position, resilient means 186 holds sleeve 198 adjacent pin 204 by acting on poppet 184 to move pin 206 against the bottom of slot 202. In this position fluid in reservoir 130 can freely pass into chambers 132 and 180 to maintain fluid communication with supply conduit 208 connected to the wheel brakes 18.

The front wheel brakes 16 receive fluid from reservoir 210 through conduit 214 after passing through chamber 212 in a manner taught in U.S. application 204,550 filed Dec. 3, 1971 and now U.S. Pat. No. 3,818,706 to provide synchronization in the operation of the braking system.

MODE OF OPERATION OF THE PREFERRED EMBODIMENT

When an operator applies an input force to pedal 20, push rod 60 will move to allow spring 76 to seat face 68 of the vacuum poppet 62 on vacuum seat 78 to interrupt communication between the first chamber 30 and the bore 56 through passage 80. Further movement of the push rod 60 will move the first atmospheric seat 86 away from face 68 to allow air at atmospheric pressure in bore 56 to enter the rear or second chamber 32 through passage 110 to create a pressure differential across the wall means 28 with vacuum in the first chamber 30. This pressure differential will provide an operational force which is transmitted through the hub 34 to simultaneously move the first piston 114 and the second piston 152. Initial movement of piston 114 will move flange 124 past the first compensation port 126 to pressurize the fluid in chamber 132. This pressurized fluid is freely transmitted through passage 178 to the supply conduit 208 by way of chamber 180 and passage 216. The fluid pressure build-up in chamber 180 will move a master cylinder piston (not shown) in chamber 212 to provide operational pressurized fluid in supply conduit 214 for transmission to the front wheel brakes 16. The output force from the simultaneous movement of the first piston 114 and the second piston 152 will follow a line 218 shown in FIG. 2, until the entire chamber 32 is filled with air at atmospheric pressure, point 220 in FIG. 2. Further input force from pedal 20 will be transmitted from push rod 60 through plunger 90 to develop a corresponding force in the reaction disc 158 which will individually move the second piston 152 with respect to the first piston 114. Initial, individual movement of the second piston 152 will permit resilient means 186 to seat poppet 184 on seat 190 to interrupt communication between the first chamber 132 and the second chamber 180. Further individual movement of the second piston 152 will slide the first pin 204 and the second pin 206 in slots 200 and 202, respectively, until engagement with the ends of sleeve 198, after which the movement will lift poppet 144 off seat 150 to reduce the fluid pressure in chamber 132 by permitting a portion of the fluid to escape to the reservoir 130 through passage 140 into chamber 134. With a fluid reduction in chamber 132, the operational pressure differential across the wall means 28 acting on hub 34 will simultaneously move the first piston 114 and the second piston 152 to produce an operational output from the second piston 152 which will follow a curve that approaches the dashed line 222. When the fluid pressure in the first chamber 132 has been reduced to that approaching that in chamber 134, point 224, the entire operational pressure differential acting on wall means 28 will have been transferred to the second piston 152. Now any further input from pedal 20 will be directly applied to the second piston 152, the output of which will follow line 226, FIG. 2.

Upon a reduction of the input force on the brake pedal 20, the fluid pressure in the second chamber will act on face 228 to move the second piston toward the first chamber 132 allowing resilient means 146 to urge poppet 144 on seat 150 to prevent communication between chamber 132 and relief chamber 134. Further movement of the second piston 152 toward the first piston 114 allows pins 204 and 206 to engage sleeve 198 to unseat poppet 184 and permit the hydraulic fluid under pressure to expand in the first chamber 132 and proportionally reduce the pressure of the operational fluid.

Upon termination of the input force the return spring 96 will move the plunger 66 into contact with the atmospheric poppet 64 which in turn will seat on the vacuum poppet 62 to allow vacuum to evacuate air from the second chamber 32. As the pressure differential across the wall means 28 is reduced, return spring 103 will move the hub 34 toward the second shell 24. When the wall means 28 reaches the rear shell 24, the flange 124 on the first piston 114 will have passed the first compensating port 126 to equalize the pressure in the first chamber 132 with the reservoir 130.

In the event that vacuum is unavailable at the intake manifold, input from the operator will be applied through push rod 60 to move plunger 66. The force from the plunger 66 will be transmitted into the reaction disc 158 to individually move the second piston 152 and permit resilient means 186 to urge poppet 184 on seat 190 and close passage 178 between the second chamber 180 and the first chamber 132. Any further input force will move the second piston 152 in the second chamber 180 and develop an output force similar to line 230, see FIG. 2, for pressurizing the fluid in the second chamber to provide the wheel brakes 18 with an operational input force.

I claim:
1. In a power braking system having a servomotor for supplying an operational force to wheel brakes upon simultaneous movement of a first piston and a second piston by a differential pressure force transmitted through a wall to produce a first operational fluid pressure in response to an input force, metering means for proportionally transferring that portion of the differential pressure force transmitted through the first piston to the second piston when the second piston is independently moved by the input force to produce a second operational fluid pressure, said metering means comprising:
   a housing having a bore therein, said first piston being located within the bore to form a first chamber therein, said second piston being located within the bore to form a second chamber therein, said first chamber being connected to a third chamber, said first chamber being connected to a third chamber through a first passage, said first chamber being connected to the second chamber through a second passage;
   first valve means associated with the first passage for controlling fluid communication between the first chamber and the third chamber, said first valve means being closed during said simultaneous movement;
   second valve means associated with the second passage for controlling fluid communication between the first chamber and the second chamber, said second valve means being opened during said simultaneous movement; and
   connector means located between said first valve means and the second valve means for operating the first valve means after the second valve means is closed through the independent movement of the second piston to permit the first fluid pressure present in the first chamber to be proportionally communicated to the third chamber as a function of the input force which moves the second piston in opposition to the operational force to allow the wall to move the first piston and close the first valve means while transmitting a differential pressure force to the second piston for establishing the second operational fluid pressure.

2. In the power braking system, as recited in claim 1, wherein said connector means includes:
   a first stem extending from the first valve means toward the second valve means;
   a second stem extending from the second valve means toward the first valve means; and
   linkage means attached to the first stem and the second stem for permitting the operation of the first valve means and the second valve means to sequentially occur.

3. In the power braking system, as recited in claim 2, wherein said linkage means includes:
   a sleeve connected to the first stem and the second stem, said sleeve having a first slot and a second slot;
   first pin means located in said first slot and attached to the first stem; and
   second pin means located in said second slot and attached to the second stem, said individual movement by the second piston causing the second pin to move in the second slot and engage the sleeve which in turn transmits movement to the first stem through the engagement of the first pin means.

4. In the power braking system, as recited in claim 3, wherein said first valve means includes:
   first ball means located in said first passage and attached to said first stem; and
   first resilient means connected to the first piston for urging said first valve means toward a first seat to prevent the fluid pressure developed in the first chamber during the simultaneous movement of the first and second pistons from being communicated to the third chamber.

5. In the power braking system, as recited in claim 4, wherein said second valve means includes:
   second ball means located in said second passage and attached to said second stem; and
   second resilient means connected to the second piston for urging the second valve means toward a second seat during said independent movement of the second piston to prevent said second operational fluid pressure from being communicated from the second chamber to the first chamber.

6. In the power braking system, as recited in claim 5, wherein said metering means further includes:
   reaction means for providing an operator with an indication of the first operational fluid pressure and the second operational fluid pressure produced in response to the operational input force.

7. In the power braking system, as recited in claim 6, wherein said reaction means includes:
   means having first and second portions for engaging said second piston, said first portion transmitting the output from the wall to move the second piston; and
   said second portion providing the operator with an indication of the first and second operational fluid pressure being produced in response to movement of the wall.

\* \* \* \* \*